United States Patent [19]

Parry

[11] 3,785,910

[45] Jan. 15, 1974

[54] ULTRASONIC SEAMING APPARATUS INCLUDING FEED MEANS

[75] Inventor: Frank Parry, Monroe, Conn.

[73] Assignee: Branson Instruments, Incorporated, Stamford, Conn.

[22] Filed: May 1, 1972

[21] Appl. No.: 248,943

[52] U.S. Cl. ............................................. 156/580
[51] Int. Cl. ........................................... B32b 31/16
[58] Field of Search .............................. 156/73, 580

[56] References Cited
UNITED STATES PATENTS

| | | | |
|---|---|---|---|
| 3,730,817 | 5/1973 | Frohlich | 156/580 |
| 3,640,786 | 2/1972 | Carpenter | 156/73 |
| 3,733,238 | 5/1973 | Long et al. | 156/73 |

Primary Examiner—Douglas J. Drummond
Attorney—Ervin B. Steinberg

[57] ABSTRACT

An ultrasonic seaming apparatus comprising a driven anvil wheel and an oppositely disposed resonating horn forming a seaming station through which flexible sheet material to be seamed is fed includes a driven workpiece feed wheel which is resiliently urged toward contact with the anvil wheel for assisting in feeding the seamed portion of the workpiece away from the seaming station. This arrangement minimizes the occurrence of puckering in sheer workpiece material. Additional workpiece feed means in the form of driven rollers are mounted distanced from the stated workpiece feed wheel.

3 Claims, 7 Drawing Figures

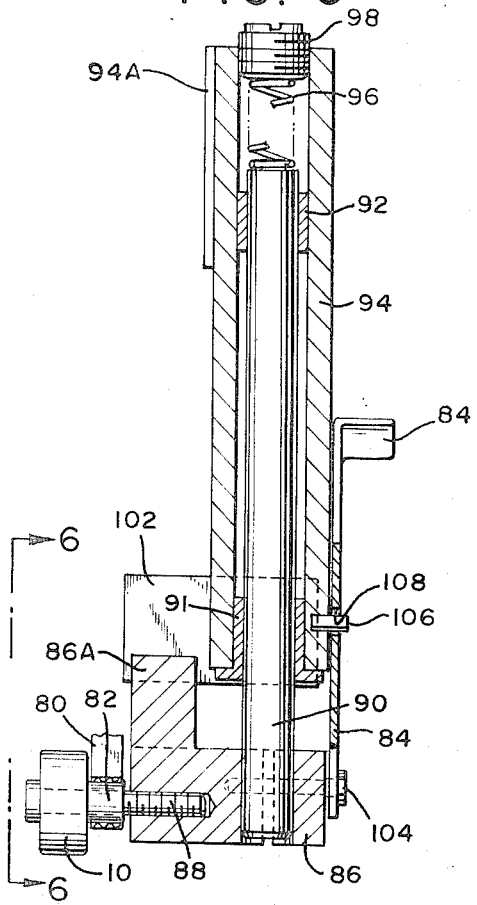
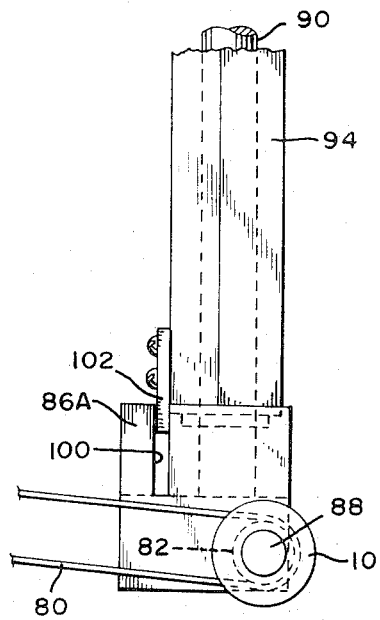
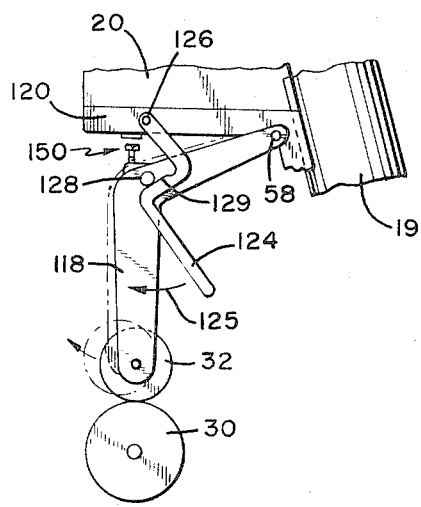

3,785,910

ULTRASONIC SEAMING APPARATUS INCLUDING FEED MEANS

CROSS-REFERENCE TO RELATED PATENT APPLICATIONS

This patent application is related to copending applications for U.S. Letters Patent Ser. No. 093,151 filed Nov. 27, 1970, Edward G. Obeda, entitled "Sonic or Ultrasonic Seaming Apparatus", now U.S. Pat. No. 3,666,599 dated May 30, 1972 and Ser. No. 166,462 filed July 27, 1971, Edward G. Obeda et al, entitled "Ultrasonic Sewing Machine" now U.S. Pat. No. 3,734,805 dated May 22, 1973.

BACKGROUND OF THE INVENTION

The present invention concerns an ultrasonic seaming apparatus in which vibratory energy in the sonic or ultrasonic frequency range is used for welding or fusing together two superposed flexible sheet materials by passing such materials between a rotatable anvil and the output surface of a resonating horn. An apparatus of this type is particularly suited for seaming thermoplastic sheets or textile materials made entirely of partially of thermoplastic fibers and is known also as an "ultrasonic sewing machine", although no needle and thread are used for providing a seam.

The principle and construction of ultrasonic seaming apparatus, operating usually at a frequency above 16 kHz and most suitably at a frequency between 20 to 50 kHz, are described in the patent references stated heretofore which are incorporated herein by reference.

Unique problems present themselves when a seaming apparatus of this type is used for seaming sheer material, for instance curtain material. Upon feeding such material through the seaming station between the resonating horn and the anvil, puckering occurs which adversely affects the appearance, quality, and sales appeal of the seamed article. It has been found that such puckering can be minimized, if not totally eliminated, if a special feed wheel is provided which is disposed for engaging the workpiece immediately after its emergence from the seaming station, pulling the workpiece away from such station. Therefore, the present invention concerns the provision of a workpiece feeding wheel designed and mounted in such a way that it is urged toward contact with the periphery of the rotating anvil wheel and engages the respective workpiece portion immediately after the passage thereof between the anvil wheel and the frontal surface of the resonating horn. Means are present for driving the anvil wheel and the workpiece feed wheel at coordinated peripheral speeds.

A principal object of this invention is, therefore, the provision of a new and improved ultrasonic seaming apparatus.

Another important object of this invention is the provision of an ultrasonic seaming apparatus specifically suited for seaming sheer material.

A still other object of the present invention concerns the construction of an ultrasonic seaming apparatus which is provided with a workpiece feed wheel mounted for engaging the workpiece immediately after its passage through the seaming station.

A further object of this invention is the provision of an ultrasonic seaming apparatus which includes a seaming station comprising a rotatable anvil wheel and a resonating horn mounted for providing ultrasonic energy to a workpiece which is fed between the frontal surface of the horn and the anvil, a workpiece feed wheel disposed for engaging the workpiece, means for urging the workpiece feed wheel toward contact with the anvil wheel, and drive means coupled for driving the anvil wheel and the workpiece feed wheel at correlated peripheral speeds.

Further and other objects of this invention will be more readily apparent by reference to the following description when taken in conjunction with the accompanying drawing.

BRIEF DESCRIPTION OF THE DRAWING:

FIG. 5 is a sectional view taken along line 5—5 of FIG. 3;

FIG. 6 is an elevational view along line 6—6 of FIG. 5, and

FIG. 7 is an elevational view taken along line 7—7 of FIG. 1.

DETAILED DESCRIPTION OF THE PREFERRED EMBODIMENT

Figure 1:
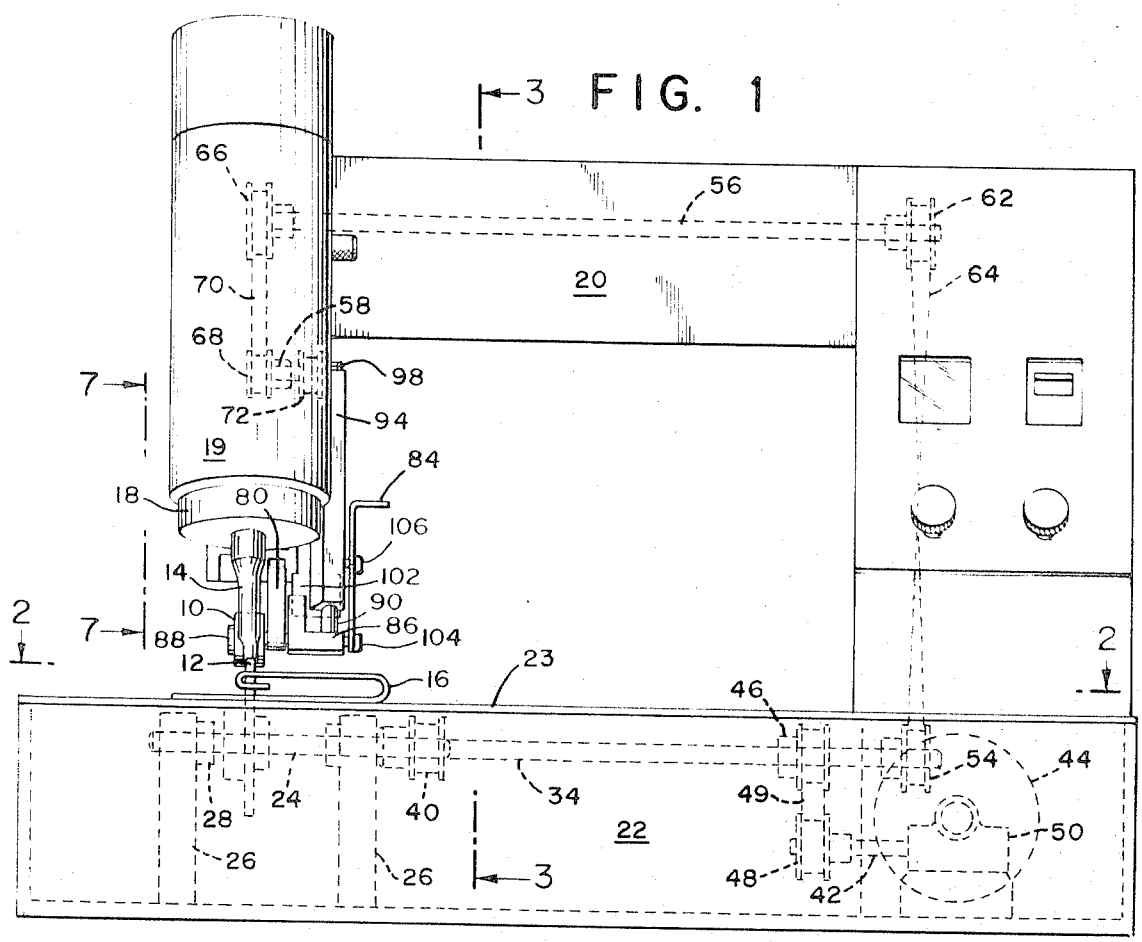
FIG. 1 is a front elevational view of a preferred embodiment of the ultrasonic seaming apparatus in accordance with the present invention.
Figure 2:
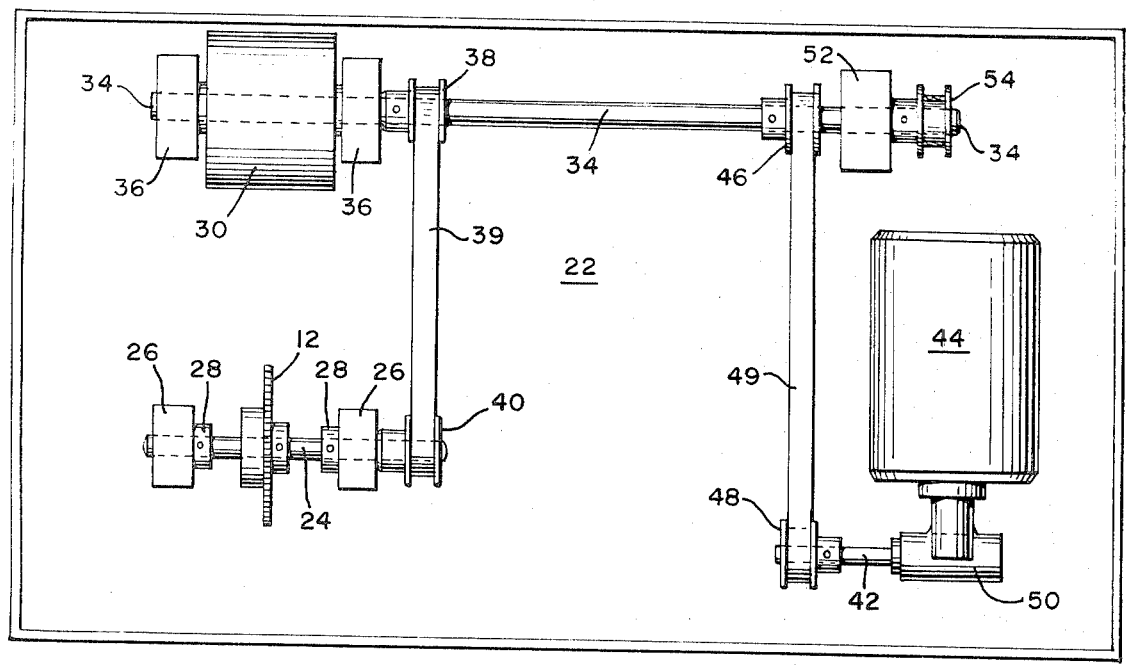
FIG. 2 is a plan view taken along line 2—2 of FIG. 1 with cover removed.

Referring now to the figures and FIGS. 1 to 4 in particular, there is shown an ultrasonic seaming apparatus which is adapted to feed a workpiece W, such as two superposed textile sheets, through a seaming station and impart ultrasonic vibrations in the ultrasonic frequency range to the workpiece in order to obtain seaming or fusing of the thermoplastic constituents provided in the workpiece W. The mechanism for feeding the workpiece W through the seaming station includes rotatably mounted feed wheel 10 whose peripheral surface preferably is provided with resilient material, such as rubber. The feed wheel 10, by means to be described later, is resiliently urged against the periphery of a rotatable anvil wheel 12. A suitable horn 14, also known as resonator, tool, mechanical amplitude transformer, concentrator, etc. is mounted so that its frontal or output surface is in contact with the workpiece W for ultrasonically welding or seaming the workpiece as the workpiece is fed through an adjustable gap between the anvil wheel 12 and the horn 14. A folding or hem forming attachment 16 may be positioned in front of the seaming station in order to suitably fold the workpiece before it enters the seaming station. The horn 14 is mechanically coupled by means well known to those skilled in the art to a converter unit 18 which, in turn, is supported in a sleeve 19 mounted to a main support 20 which is elevated from a hollow base 22. The converter unit receives high frequency electrical energy from a suitable power supply unit (not shown) and converts such high frequency electrical energy to mechanical vibrations by means of piezoelectric or magnetostrictive transducing means. Converter units of this type are commercially available and a typical unit suitable for this purpose is described also in U.S. Pat. No. 3,328,610 issued to S. E. Jacke et al on June 27, 1967, entitled "Sonic Wave Generator". The horn 14 receives the vibrations from the converter unit and is dimensioned to resonate as a half wavelength resonator along its axis at the predetermined frequency, all as is well understood by those skilled in the art.

The base 22 serves to house several components of the present apparatus including the rotatable anvil wheel 12 which is mounted upon a shaft 24 which is journalled in a pair of spaced bearing supports 26. A set of collars 28 are secured to the shaft 24 to prevent axial displacement thereof and consequently to secure the anvil wheel 12 in cooperating position with the frontal surface of the horn 14. The hollow base is enclosed by a cover 23 which serves also as a table for the workpiece W to advance thereacross. A slot 25 in the cover 23 permits a portion of the anvil wheel 12 to protrude from the base for cooperating with the horn.

Two opposed rollers 30 and 32 provide a further means of advancing the workpiece W through the seaming station. These rollers are located spaced rearwardly of the feed wheel 10 and anvil wheel 12 and serve to additionally pull the workpiece away from the seaming station. The lower roller 30 is secured to a shaft 34 which is journalled in a pair of spaced supports 36 mounted inside the base 22, see FIG. 2. The upper portion of the roller 30 projects through an opening 27 in the cover 23 for cooperation with the opposing roller 32. It is, no doubt, apparent that the peripheral speeds of the anvil wheel 12, feed wheel 10, and rollers 30 and 32 must be substantially the same, but in some instances it has been found advantageous that the workpiece feed wheel 10, and rollers 30 and 32 have a slightly faster peripheral speed than that of the anvil 12 in order to prevent a slack in the workpiece. In other instances, it will be found advantageous to adjust the speeds so that the feed wheel and rollers rotate with a slightly lower peripheral speed in order to prevent a stretching of the workpiece material. Whatever the differences in peripheral speeds, the variations are very minute. The relative speeds are determined and adjusted by the relative diameters of the pulleys on the drive and driven shafts, such as pulley 38 on the shaft 34 which drives the pulley 40 on shaft 24 through a flexible belt 39. The shaft 34 is driven from an output shaft 42 of an electric motor 44 through pulleys 46 and 48 and interconnecting belt 49. The motor 44 is coupled to a speed reducing means 50 to furnish the desired revolutions per minute at the output shaft 42. The right end of the shaft 34 (FIG. 2) extends beyond the support 52 for supporting a pulley 54 which is provided for the purpose of transmitting motion to the workpiece feed wheel 10 through intermediate shafts 56, 58 and 60 (FIGS. 1, 3 and 4) and the motion to the upper roller 32 simultaneously through intermediate shafts 56 and 58. It will be apparent that the direction of rotation is adjusted so that the feed wheel 10 and roller 32 rotate in the opposite direction from that of anvil wheel 12 and roller 30. Since belts are used for power transmission a reversal of rotation is readily accomplished by crossing a respective belt.

The pulley 54 transmits motion to the shaft 56, which is journalled in the housing 20, through a pulley 62 affixed to the shaft and a belt 64. The shaft 58, FIG. 1, is driven from shaft 56 through pulleys 66 and 68 and a drive belt 70. A second pulley 72 affixed to the shaft 58 drives the shaft 60, FIG. 3, through a pulley 74 and belt 76, and a second pulley 78 on a shaft 60 drives the feed wheel 10 through a belt 80.

The belt 80 drives a pulley 82, FIG. 5, which is constructed to form an integral part of the feed wheel 10. The feed wheel 10 can be lifted away from engagement with the periphery of the anvil wheel 12 for threading the workpiece W therebetween by manipulating a lever 84 for raising a foot 86 which carries a stud shaft 88 upon which the feed wheel 10 is journalled. The foot 86 is fastened to the end of a vertical rod 90 which is slidably mounted in bushings 91 and 92 disposed in a block 94. The feed wheel 10, during operation, is resiliently urged against the periphery of the anvil wheel 12 directly behind the horn 14 by the force exerted by a helical spring 96 which presses against the upper end of the rod 90. The spring pressure is adjustable responsive to the rotation of a screw plug 98 threaded in the upper end of block 94. In order to prevent the foot 86 from rotating about the axis of rod 90, a plate 102 (FIG. 6) secured to the block 94 cooperate in a slot 100 formed in an offset portion 86A of the foot 86.

Lever 84 pivotally secured at its lower end to pin 104 disposed in the foot 86 limits the downward motion of the foot 86 as a result of the force exerted by the spring 96. A second pin 106 disposed in the block 94 extends through a slot 108 in the lever 84. In order to lift the foot 86, the lever 84 is moved in the direction of the arrow 109, FIG. 3, in a manner pivoting about the pin 104, causing the slot 108 to move over the pin 106 into an undercut portion 110 disposed in the other end of the slot. This secures the foot 86 in its lifted position.

Figure 3:
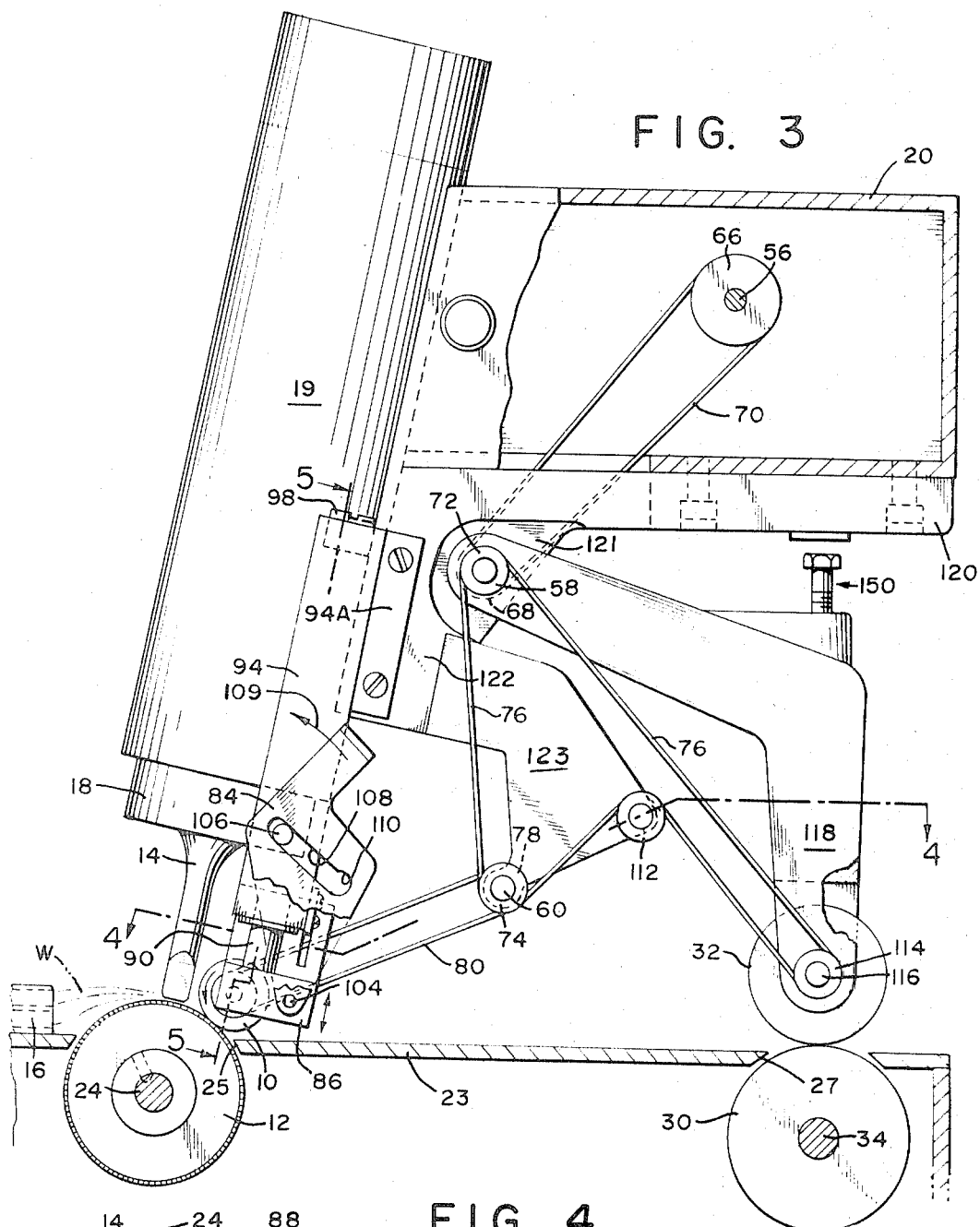
FIG. 3 is an elevational view taken along line 3—3 of FIG. 1.
Figure 4:
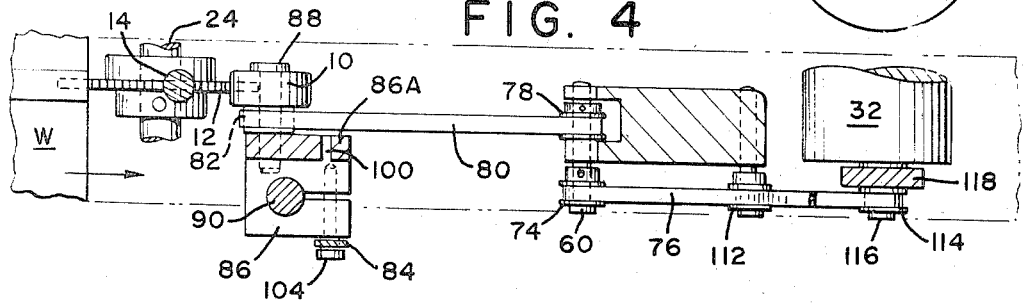
FIG. 4 is a sectional plan view taken along line 4—4 of FIG. 3.

With reference to FIG. 3, it will be noted that the belt 76 is threaded over an idler pulley 112 and around a pulley 114 for driving a shaft 116 upon which the workpiece feed roller 32 is mounted. The shaft 116 is carried by an arm 118 which pivotally mounted at its opposite end upon the shaft 58 for movement of the roller 32 against and away from the underlying roller 30. The shaft 58 is journalled in a bearing support area 121 of a bracket 120 which is secured by screws to the underside of the main support 20. An angularly offset portion 122 of the bracket 120 provides a mounting surface for lip 94A of block 94 and also supports a depending bracket 123 which journals the shaft 60 and pulley 112.

The roller 32 can also be raised out of contact with the underlying roller 30 by manually operating a lever 124 (FIG. 7) which pivots about a pin 126 in the bracket 120. If the lever 124 is moved clockwise in the direction of the arrow 125, a pin 128 disposed in the arm 118 will ride up the inclined surface 129 of the lever 124, thus raising the arm 118 and consequently lifting the roller 32. Stop means 150 are provided to limit the upward motion of the arm 118. Engagement pressure is provided by either gravity alone or additional spring means.

DESCRIPTION OF THE OPERATION.

In operation the workpiece W is placed between the frontal surface of the horn 14 and the anvil wheel 12 and between the anvil wheel 12 and the workpiece feed wheel 10. The horn then is lowered toward the anvil wheel 12 and the feed wheel 10 is lowered to press the workpiece W between it and the anvil wheel 12, using the lever 84 as described. In response to the drive motor 44 being energized, the converter unit 18 is energized also as has been described in the patent application identified hereinabove, and ultrasonic energy is transferred from the converter unit and horn to the workpiece while the workpiece passes through the seaming station. As the workpiece approaches the rollers 30 and 32, if the drive rollers 32 is in its raised position, lever 124 is operated to lower the roller 32, causing the workpiece to become confined between rollers 30 and 32. The feed wheel 10, the anvil wheel 12, and the rollers 30 and 32, all are driven by the motor 44 to feed the workpiece W through the seaming station while ultrasonic energy is imparted to the workpiece W. The feed wheel 10 may be used in conjunction with the rollers 30 and 32, or either feed means may be used separately, depending upon the circumstances and the material processed. It has been found that the arrangement described hereinabove substantially eliminates the occurrence of puckering which was not the case when the feed rollers 30 and 32 were used alone. Additionally, the provision of the feed wheel 10 prevents a "smearing" of the fused area apparently caused by the workpiece not advancing by a sufficient increment through the seaming station. Finally, the wheel 10 aids the pulling action of he rollers 30 and 32.

As shown, the feed wheel 10 is disposed directly in the line of travel of the workpiece so that there is no side pull exerted upon the workpiece. However, it will be apparent that the feed wheel 10 can readily be mounted angled with respect to the axis of shaft 24 and thus provide a side thrust which appears desirable in instances when a plurality of anvil wheels 12 are used in juxtaposed relation for producing a plurality of parallel seams.

What is claimed is:

1. In an ultrasonic seaming apparatus for seaming relatively sheer workpieces the combination comprising:

a support;

means securing an ultrasonic converter unit to said support, said converter unit including transducing means for converting applied electrical high frequency energy to mechanical vibration;

a horn adapted to be resonant at a predetermined frequency coupled to said converter unit for receiving said mechanical vibration and applying such vibration to a workpiece in contact with the frontal surface of said horn;

a rotatably mounted anvil wheel disposed opposite said frontal surface for forming with said frontal surface a seaming station adapted to accept a sheet-like relatively shear workpiece which is fed between and in contact with said anvil wheel and said frontal surface;

a workpiece feed wheel disposed for engaging the workpiece after the workpiece has been fed through the seaming station;

means mounting and resiliently urging said workpiece feed wheel toward contact with said anvil wheel for engaging the workpiece and feeding the workpiece away from said frontal surface to prevent puckering of the workpiece, and drive means coupled to said anvil wheel and said workpiece feed wheel for driving said wheels at correlated peripheral speeds.

2. In an ultrasonic seaming apparatus for seaming relatively sheer workpieces the combination comprising:

a support;

means securing an ultrasonic converter unit to said support, said converter unit including transducing means for converting applied electrical high frequency energy to mechanical vibration;

a horn adapted to be resonant at a predetermined frequency coupled to said converter unit for receiving said mechanical vibration and applying such vibration to a workpiece in contact with the frontal surface of said horn;

a rotatably mounted anvil wheel disposed opposite said frontal surface for forming with said frontal surface a seaming station adapted to accept a sheet-like relatively sheer workpiece which is feed between and in contact with said anvil wheel and said frontal surface;

a workpiece feed wheel disposed for engaging the workpiece after the workpiece has been fed through the seaming station;

means mounting and resiliently urging said workpiece feed wheel toward contact with said anvil wheel for engaging the workpiece and feeding the workpiece away from said frontal surface to prevent puckering of the workpiece;

drive means coupled to said anvil wheel and said workpiece feed wheel for driving said wheels at correlated peripheral speeds, and means coupled to said workpiece feed wheel for lifting said feed wheel from said anvil wheel and retaining said feed wheel in lifted position away from contact with said anvil wheel.

3. In an ultrasonic seaming apparatus for seaming relatively sheer workpieces as set forth in claim 2, said means for lifting said feed wheel incluidng a pivotally secured lever having a slot which is provided with an undercut portion for engagement by a pin, such engagement retaining said feed wheel in its lifted position.

* * * * *